Patented Feb. 22, 1949

2,462,107

UNITED STATES PATENT OFFICE 2,462,107

PROCESS FOR PREPARATION OF DIACETYL

Theodore Kritchevsky, Chicago, Ill., assignor to Ninol Development Co., Chicago, Ill.

No Drawing. Application May 3, 1943,
Serial No. 485,514

9 Claims. (Cl. 260—596)

My invention relates to a new and useful process for the preparation of diacetyl and is particularly concerned with a process which is simple in operation and brings about marked economies in the production of diacetyl.

Diacetyl has heretofore been produced by fermentation methods involving the use of certain cultures and it has also been produced by synthetic processes, as, for example, by the oxidation of methyl vinyl ketone, and by the oxidation of 2,3-butanediol. The fermentation method is laborious, yields of diacetyl are low, and the process presents other deficiencies with which those skilled in the art are familiar and which require no elaboration. Synthetic processes, for example, by the oxidation of methyl vinyl ketone or by the oxidation of 2,3-butanediol, while, generally speaking, definitely superior to fermentation processes, nevertheless leave much to be desired. In general, yields of diacetyl are relatively low and the processes are costly and somewhat cumbersome to operate.

In accordance with my invention, diacetyl may be produced in a simple manner, at low costs, and with high yields. In general, my process for the production of diacetyl comprises bringing 2,3-butanediol in the vapor phase into contact with a dehydrogenation catalyst at dehydrogenation temperatures in the absence or substantial absence of air or oxygen. This is most conveniently done by providing a body of the dehydrogenation catalyst disposed within a suitable reaction chamber, preferably in the form of a long cylinder, the dehydrogenation catalyst being heated in any suitable manner to and maintained at the desired temperature, the air being swept out of the reaction chamber by means of an inert gas such as nitrogen, argon or the like, and the 2,3-butanediol in vapor phase being passed through the body of said catalyst at a relatively slow rate. The speed or rate of production of the diacetyl depends upon a plurality of factors, such as, for example, the character of the dehydrogenation catalyst employed, whether or not catalyst promoters are utilized, the temperature at which the reaction is carried out, the rate of passage of the 2,3-butanediol vapors through the body of catalyst, and upon other factors which those skilled in the art will appreciate in the light of the teachings given herein.

The process may, if desired, be operated with considerable advantage as a cyclic process, the diacetyl being recovered from the reaction mixture by fractionation or in any other suitable manner after each pass through the body of catalyst, the unreacted material then being recycled through the body of catalyst. It has been found that yields of 20% to 67% and even higher of diacetyl may be obtained in a single pass of the 2,3-butanediol through the body of catalyst, it being understood that the higher the yield of diacetyl obtained in a single pass, the more slowly must the 2,3-butanediol vapors be passed through the body of catalyst. It will also be appreciated that the time required for any single pass will depend, of course, on the height or length of the body of catalyst through which the 2,3-butanediol vapors are passed. After recovery of the diacetyl by fractionation or by other means from the reaction mixture, the residue or unreacted portion remaining may then again be passed in vapor form through the body of catalyst to provide a cyclic process, as above described. Generally speaking, there is some slight loss of 2,3-butanediol by decomposition or carbonization, ordinarily not more than about 5%, the remaining 2,3-butanediol which has not been converted to diacetyl being unaffected.

The following examples are illustrative of the practice of my invention. It will be understood that various changes may be made therein as, for example, by the substitution of other dehydrogenation catalysts, the use of different temperatures, the employment of catalyst promoters and carriers, and the like, without departing from the spirit of my invention in the light of my teachings herein.

Example 1

A copper-copper oxide, prepared by precipitation, was treated with hydrogen at slowly increasing temperatures up to 300 degrees C. to provide an active copper dehydrogenation catalyst. The resulting catalyst was loosely packed into a cylindrical glass tube about four feet long and an inch in diameter to provide a bed of catalyst occupying about two feet of the length of the tube. Above the upper surface of the catalyst a few inches of glass beads were placed. The tube was set at an incline and that portion which was filled with the glass beads and catalyst was enclosed within a furnace. The lower portion of the tube extending outside the furnace was connected to a condenser. The tube was heated and maintained at about 325 degrees C., the air being swept out therefrom, during the heating, by means of a stream of nitrogen, and 20 grams of 2,3-butanediol were then passed into the higher end of the tube at the rate of about four drops per minute. Upon striking the hot glass beads the 2,3-butanediol vaporized and the vapors passed through the bed of catalyst. The issuing vapors were condensed and collected. The reaction mixture thus obtained on a single pass through the body of catalyst was fractionated, a yield of 30% of diacetyl, based on the amount of 2,3-butanediol used, being obtained. The remainder of the reaction mixture comprising the unreacted material, was recycled. The diacetyl was recovered from the recycled mass after passage through the body of catalyst. The recycling process can be carried out continuously, if desired, preferably with periodic additions of 2,3-butanediol to the recycling liquid.

*Example 2*

The reaction was carried out in the same manner as described in Example 1, except that, instead of using a copper catalyst and a temperature of 325 degrees C., a brass catalyst, in the form of clean brass shavings or turnings, was utilized and, in addition, the reaction temperature employed was about 450 degrees C. A 60% yield of diacetyl was obtained on a single pass of the 2,3-butanediol through the body of catalyst.

*Example 3*

The reaction was carried out as described in Example 1, except that a temperature of 350 degrees C. was employed and, instead of the copper catalyst, a copper-chromite catalyst was employed. A 20% yield of diacetyl was obtained on a single pass of the 2,3-butanediol through the body of catalyst.

As I have indicated hereinabove, the temperature at which the dehydrogenation reaction is carried out is subject to variation. In general, any temperature above the vaporization point of 2,3-butanediol may be employed. In the ordinary case, temperatures of the order of about 250 or 300 degrees C. to about 550 or 600 degrees C. or somewhat higher are most conveniently utilized, although it will be appreciated that the temperature employed will vary with the particular catalyst selected. It will also be understood, of course, that the exact yields of diacetyl obtained will also vary somewhat with the temperature and with the character of the catalyst utilized. In general, I prefer to employ a temperature range of about 400 degrees C. to about 500 degrees C., approximately 450 degrees C. being satisfactory in most cases.

The reaction is preferably carried out at atmospheric pressures but may, if desired, be conducted at either sub-atmospheric or super-atmospheric pressures. In certain instances, advantages result from the utilization of sub-atmospheric or super atmospheric pressures but, in general, excellent results are obtained and it is simpler to operate at atmospheric pressures. It is sometimes of advantage to pass an inert gas such as nitrogen or argon and, in certain instances, steam, through the bed of catalyst simultaneously with the passage of the 2,3-butanediol vapors. Such practices are obviously clearly within the scope of my invention.

The mechanical details of bringing about contact of the 2,3-butanediol vapors with the catalyst are subject to considerable variation. Thus, for example, the liquid 2,3-butanediol may be placed into a separate distilling vessel and continuously distilled therefrom, the vapors being passed through the catalyst bed in a continuous manner, and I have found that excellent results are so obtained. Again, instead of arranging the reaction tube with the 2,3-butanediol vapor inlet at the higher end of the tube, said inlet may be at the lower end of the tube. In such cases, the 2,3-butanediol vapors are passed from a separate distilling vessel into the lower end of the heated reaction tube. Since the diacetyl boils at roughly 100 degrees C. lower than does the 2,3-butanediol, this procedure enables refluxing or, in a sense, recycling of the unconverted material to occur. Again, I may, if desired, arrange the reaction tube vertically, preferably introducing the 2,3-butanediol vapors at the bottom and continuously drawing off the diacetyl-containing vapors and condensing them.

The dehydrogenation catalyst which I employ in accordance with my present invention may be selected from a large group, representative examples of which are iron, manganese, tin, vanadium, copper, platinum, palladium, osmium, rubidium, molybdenum, chromium, heavy metal molybdates, copper-copper oxide, copper-copper hydroxide, copper+chromium+magnesium, copper+phosphoric acid, copper-magnesium alloys; copper+oxides of chromium, manganese, magnesium and zinc; zinc oxide, zinc chloride, zinc sulfide, cobalt, nickel, nickel sulfide, cadmium sulfide, nickel-magnesium alloys, nickel-copper alloys, titanium, ammonium tungstate, ammonium vanadate, charcoal, aluminum oxide, copper-zirconium alloys, copper-cerium alloys, brass, bronze, copper-lead-tin alloys, silver plated brass, potassium hydroxide, potassium carbonate, chromium oxide, and the like, including mixtures of any two or more thereof. I prefer, in the ordinary case, to use brasses, because they produce high yields of diacetyl and, in addition, their activity exists over relatively long periods of time, or, in other words, they do not poison readily. By the term brass or brasses, I mean to include copper-zinc alloys whether containing only copper and zinc or additional elements generally in small proportions, such as tin, magnesium and the like.

I may also, in certain cases, with advantage, utilize carriers for the catalysts. Among such carriers which may be employed are silica gel, asbestos, kieselguhr, pumice, kaolin, glass wool, copper wire or net, brass wire or net, diatomaceous earth, glass, alumina, zeolites, celite, manganese dioxide, magnesium oxide, magnesium carbonate, talc, sand, and the like.

I may also employ, as I have indicated above, dehydrogenation catalyst promoters. These include, for example, iron, silver, cerium, thorium, nickel, aluminum oxide, zinc oxide, lead, manganese, sodium hydroxide, sodium carbonate, and the like, including mixtures of any two or more thereof.

While I have described my invention in detail, it will be understood that various modifications may be made in the light of my teachings without departing from the spirit and scope of my invention as pointed out in the claims.

What I claim as new and desire to protect by Letters Patent of the United States is:

1. In a method of preparing diacetyl, the step which comprises contacting 2,3-butanediol in the vapor phase with a dehydrogenating catalyst at dehydrogenating temperatures in the substantial absence of oxygen.

2. In a method of preparing diacetyl, the step which comprises contacting 2,3-butanediol with a dehydrogenating catalyst at temperatures of the order of about 300 degrees C. to about 600 degrees C. in the substantial absence of oxygen.

3. In a method of preparing diacetyl, the step which comprises contacting 2,3-butanediol in the vapor phase with a dehydrogenating catalyst at dehydrogenation temperatures in the substantial absence of oxygen, said dehydrogenating catalyst comprising a metal containing a high content of copper.

4. In a method of preparing diacetyl, the step which comprises contacting 2,3-butanediol with a dehydrogenating catalyst at temperatures of the order of about 300 degrees C. to about 600 degrees C. in the substantial absence of oxygen, said dehydrogenating catalyst comprising a brass.

5. A cyclic method of preparing diacetyl which includes the steps of providing a body of a dehydrogenation catalyst, maintaining the same at elevated dehydrogenation temperatures, passing 2,3-butanediol in the vapor phase into contact with and through said body of catalyst in the substantial absence of oxygen, fractionating the resulting reaction mixture to recover the diacetyl therefrom, and recycling the unreacted material from which the diacetyl was separated by passing the same through said catalyst.

6. A cyclic method of preparing diacetyl which includes the steps of providing a body of a dehydrogenation catalyst, maintaining the same at a temperature of the order of about 300 degrees C. to about 600 degrees C., passing 2,3-butanediol into contact with and through said body of catalyst in the substantial absence of oxygen, fractionating the resulting reaction mixture to recover the diacetyl therefrom, and recycling the unreacted material from which the diacetyl was separated by passing the same through said catalyst.

7. A cyclic method of preparing diacetyl which includes the steps of providing a body of brass in the form of particles having a large area of surface, maintaining the same at a temperature of about 400 degrees C. to about 500 degrees C., passing 2,3-butanediol into contact with the brass in the substantial absence of oxygen, fractionating the resulting reaction mixture to recover the diacetyl therefrom, and recycling the unreacted material from which the diacetyl was separated by passing the same into contact with said brass.

8. In a method of preparing diacetyl, the step which comprises contacting 2,3-butanediol in the vapor phase with a dehydrogenating catalyst at dehydrogenating temperatures in the substantial absence of oxygen, and recovering the diacetyl from the reaction mixture by fractionation thereof.

9. In a method of preparing diacetyl, the step which comprises contacting 2,3-butanediol with a dehydrogenating catalyst at temperatures of the order of about 300 degrees C. to about 600 degrees C. in the substantial absence of oxygen, and recovering the diacetyl from the reaction mixture by fractionation thereof.

THEODORE KRITCHEVSKY.

REFERENCES CITED

The following references are of record in the file of this patent:

UNITED STATES PATENTS

| Number | Name | Date |
| --- | --- | --- |
| 1,460,876 | Williams | July 3, 1923 |
| 1,949,425 | Lazier | Mar. 6, 1934 |
| 1,952,702 | Simo | Mar. 27, 1934 |
| 2,051,266 | McAllister | Aug. 18, 1936 |
| 2,249,847 | Murray | July 22, 1941 |